(No Model.)
J. B. MEIER.
NUT WRENCH.
No. 410,985. Patented Sept. 10, 1889.
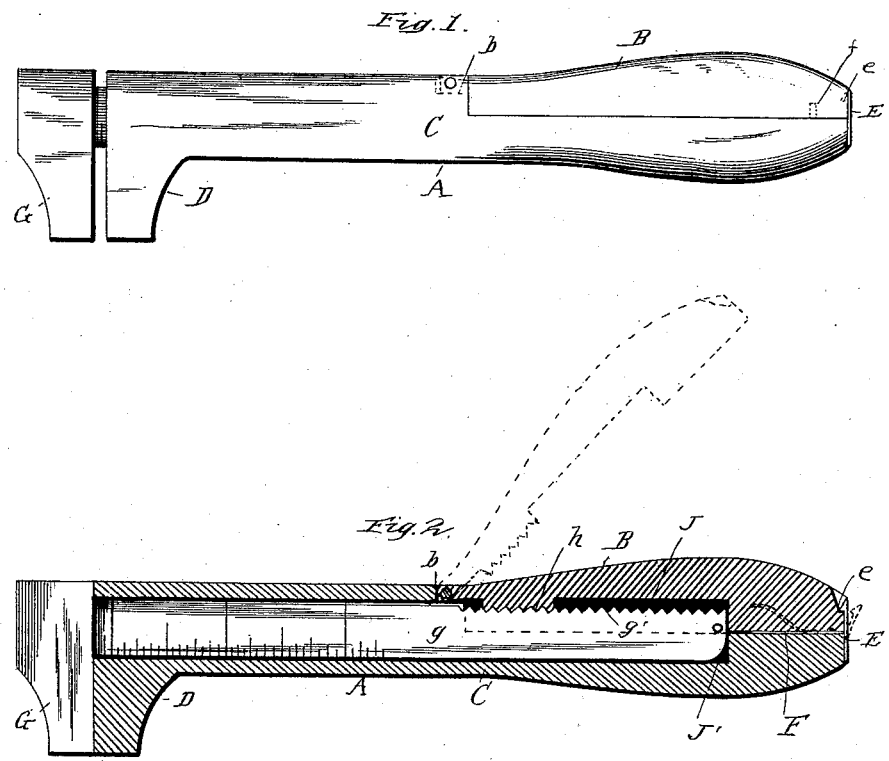
Witnesses
C. H. Raeder
Van Buren Hillyard.
Inventor
John B. Meier.
By R. S. & A. B. Lacey
Attorneys

UNITED STATES PATENT OFFICE.

JOHN B. MEIER, OF PORT HURON, MICHIGAN, ASSIGNOR OF ONE-HALF TO BENJ. J. KARRER.

NUT-WRENCH.

SPECIFICATION forming part of Letters Patent No. 410,985, dated September 10, 1889.

Application filed March 21, 1889. Serial No. 304,206. (No model.)

*To all whom it may concern:*

Be it known that I, JOHN B. MEIER, a citizen of the United States, residing at Port Huron, in the county of St. Clair and State of Michigan, have invented certain new and useful Improvements in Nut-Wrenches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to nut-wrenches which have a sliding jaw the shank of which works in the handle.

The improvement consists of the novel features which will be hereinafter more fully described and claimed, and which are shown in the annexed drawings, in which—

Figure 1 is a side view of a wrench embodying my invention; Fig. 2, a vertical longitudinal section of the same.

The handle is composed of the two parts A and B, the part A having the head C and the jaw D, and the part B pivoted to the head C in any desired manner, as by the tongue b, which is fitted in a corresponding recess in the head C. The parts A and B are symmetrical, and are held closed by a suitable catch, as the spring E, which is fastened at one end to the end of the part A, and is adapted to engage with the shoulder e on the end of the part B, the spring being set in a recess in the end of the handle, as shown, to be out of the way.

The spring F, for opening the parts A and B and holding them apart so that the jaw G can be readily adjusted, is for convenience placed between the said parts, and is by preference a flat spring, one end being fastened to the handle A, and the other end being deflected up, substantially as shown, to bear against the part B. The dowel-pin f, fastened in the part A, is adapted to enter an opening in the part B and hold the two parts against lateral movement.

The head C is longitudinally bored to receive the shank g of the sliding jaw G. The bore of the head is extended into the handle a suitable distance, being formed about half-way in each part, as shown, by the grooves J J'.

The upper edge of the shank g is serrated or provided with teeth g', which interlock with corresponding teeth h on the part B, when the latter is closed against the part A. The shank is graduated in inches to facilitate the adjustment of the jaw G.

To adjust the jaw G the catch E is released, when the parts of the handle are forced apart by the spring F, disengaging the teeth h from the teeth g'. The jaw G being free can be moved to or from the jaw D, and will be held by bringing the parts A and B together.

Having thus described my invention, what I claim, and desire to secure by Letters Patent, is—

1. A wrench comprising the jaw G, having shank g and teeth g' on the rear portion of shank g, the part A, having jaw D, groove J', and apertured head C, the said aperture and groove J' being in line and adapted to receive shank g, and the part B, symmetrical with the grooved part of A, hinged to the head C, and having a corresponding groove J and a toothed portion h, substantially as described.

2. The hereinbefore-described wrench, consisting of the parts A and B, which form the handle, the part A having groove J' in its rear portion, jaw D and apertured head C at its front end, the part B being symmetrical with the rear groove part g A and having groove J and toothed portion h hinged to the head C, the spring F and catch E, and the jaw G, having shank g, which is adapted to work in the apertured head C and in the grooves J J', said shank having teeth g', substantially as described.

In testimony whereof I affix my signature in presence of two witnesses.

JOHN B. MEIER.

Witnesses:
BENJ. J. KARRER,
LEWIS ATKINS.